(12) United States Patent
Jacobs et al.

(10) Patent No.: US 12,737,688 B2
(45) Date of Patent: Sep. 15, 2026

(54) PREDICTING VALUES FOR A MULTITUDE OF TIME SERIES WITH TARGET AND INPUT VARIABLES CONNECTED IN A GRAPH

(71) Applicant: NEC Laboratories Europe GmbH, Heidelberg (DE)

(72) Inventors: Tobias Jacobs, Heidelberg (DE); Ammar Shaker, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 476 days.

(21) Appl. No.: 18/507,203

(22) Filed: Nov. 13, 2023

(65) Prior Publication Data

US 2025/0053864 A1 Feb. 13, 2025

Related U.S. Application Data

(60) Provisional application No. 63/518,108, filed on Aug. 8, 2023.

(51) Int. Cl.
*G06N 20/00* (2019.01)

(52) U.S. Cl.
CPC .................................... *G06N 20/00* (2019.01)

(58) Field of Classification Search
CPC ......... G06N 20/00; G06N 3/045; G06N 3/084
See application file for complete search history.

(56) References Cited

U.S. PATENT DOCUMENTS 9,477,929 B2 10/2016 He et al.
10,902,343 B2 1/2021 Andrews et al.
(Continued)

FOREIGN PATENT DOCUMENTS

CN 114139062 A 3/2022
CN 114386513 A 4/2022
(Continued)

OTHER PUBLICATIONS

Chen, Huiyuan et al.; “Structured Graph Convolutional Networks with Stochastic Masks for Recommender Systems”; *Proceedings of the 44th International ACM SIGIR Conference on Research and Development in Information Retrieval*; Jul. 11, 2021; pp. 614-623; Session 3B, Recommendation 3; ACM Publications; New York, NY, USA.

(Continued)

*Primary Examiner* — Mahesh H Dwivedi
(74) *Attorney, Agent, or Firm* — Leydig, Voit & Mayer, Ltd.

(57) ABSTRACT

A computer-implemented method for training a machine learning-artificial intelligence model for multiple prediction tasks includes inputting data for tasks and additional data sources through a common trainable task representation function to obtain a data representation for each. Each resulting data representation is input through two individual trainable linear functions to obtain a corresponding prediction and adversarial prediction. A prediction error for the tasks, an adversarial error across edges of a graph, an auxiliary error for the additional data sources, and a graph error are determined. Parameters of the common trainable task representation function and the trainable linear functions are trained based on a comparison against a weighted sum of the errors. The present invention can be used in a variety of applications including, but not limited to, several anticipated use cases in drug development, material synthesis, and medical/healthcare.

12 Claims, 4 Drawing Sheets

(56) References Cited

U.S. PATENT DOCUMENTS

| | | | | |
|---|---|---|---|---|
| 2020/0118035 | A1* | 4/2020 | Asawa | G06F 16/954 |
| 2022/0066544 | A1 | 3/2022 | Kwon et al. | |
| 2023/0154215 | A1 | 5/2023 | Bharti et al. | |
| 2024/0174265 | A1* | 5/2024 | Pronovost | B60W 60/0027 |
| 2024/0174266 | A1* | 5/2024 | Pronovost | G06N 5/01 |

FOREIGN PATENT DOCUMENTS

| | | | |
|---|---|---|---|
| CN | 114579892 | A | 6/2022 |
| WO | WO 2022/169480 | A1 | 8/2022 |

OTHER PUBLICATIONS

He, Xiao et al.; "Efficient and Scalable Multi-Task Regression on Massive Number of Tasks"; *Proceedings of the 33rd AAAI Conference on Artificial Intelligence and 31st Innovative Applications of Artificial Intelligence Conference and 9th AAAI Symposium on Educational Advances in Artificial Intelligence*; Jan. 27, 2019; pp. 3762-3770; Art. No. 462; ACM Publications; New York, NY, USA.

Hu, Ronghang et al.; "UniT: Multimodal Multitask Learning with a Unified Transformer"; *2021 IEEE/CVF International Conference on Computer Vision* (*ICCV*); Aug. 18, 2021; pp. 1419-1429; vol. 3; IEEE; Piscataway, NJ, USA.

Li, Lusi et al.; "Bipartite Graph based Multi-view Clustering"; *IEEE Transactions on Knowledge and Data Engineering;* Sep. 3, 2020; pp. 3111-3125; vol. 34, No. 7; IEEE; Piscataway, NJ, USA.

Liebel, Lukas et al.; "Auxiliary Tasks in Multi-task Learning"; *Computer Vision and Pattern Recognition;* May 17, 2018; pp. 1-8; vol. 2; ArXiv.org, Cornell University; Ithaca, NY, USA.

Luo, Yadan et al.; "Adversarial Bipartite Graph Learning for Video Domain Adaptation"; *Proceedings of the 28th ACM International Conference on Multimedia;* Jul. 31, 2020; pp. 19-27; vol. 1; ArXiv.org, Cornell University; Ithaca, NY, USA.

Schmitt, Martin et al.; "Modeling Graph Structure via Relative Position for Text Generation from Knowledge Graphs"; *Proceedings of the 15th Workshop on Graph-Based Methods for Natural Language Processing;* Apr. 27, 2021; pp. 10-21; vol. 3; ArXiv.org, Cornell University; Ithaca, NY, USA.

Yi, Chang'An et al.; "Multicomponent Adversarial Domain Adaptation: A General Framework"; *IEEE Transactions on Neural Networks and Learning Systems;* May 24, 2023; pp. 6824-6838; vol. 34, No. 10; IEEE; Piscataway, NJ, USA.

You, Jiaxuan et al.; "Handling Missing Data with Graph Representation Learning"; *Proceedings of the 34th Conference on Neural Information Processing Systems;* Oct. 30, 2020; pp. 1-15; vol. 1; ArXiv.org, Cornell University; Ithaca, NY, USA.

Yu, Wenhui et al.; "Semi-supervised Collaborative Filtering by Text-enhanced Domain Adaptation"; *Proceedings of the 26th ACM SIGKDD Conference on Knowledge Discovery and Data Mining;* Jun. 28, 2020; pp. 2136-2144; vol. 1; ArXiv.org, Cornell University; Ithaca, NY, USA.

Zhou, Dan et al.; "Temporal Bipartite Graph Neural Networks for Bond Prediction"; *ICAIF '22: Proceedings of the 3rd ACM International Conference on AI in Finance;* Oct. 26, 2022; pp. 308-316 (Abstract); ACM Publications; New York, NY, USA.

* cited by examiner 300
312
Result
Prediction 310
task and input selection according to G 308
Input Dropout 306
302
304
314
316

PREDICTING VALUES FOR A MULTITUDE OF TIME SERIES WITH TARGET AND INPUT VARIABLES CONNECTED IN A GRAPH

CROSS REFERENCE TO RELATED APPLICATION

Priority is claimed to U.S. Provisional Application No. 63/518,108, filed on Aug. 8, 2023, the entire contents of which is hereby incorporated by reference herein.

FIELD

The present invention relates to a method, system, and computer-readable medium for artificial intelligence (AI) and machine learning (ML) in the multi-task setting, and in particular to a method, system, computer-readable medium and computer program product for predicting values of target variables connected to other variables by a bipartite or semantic graph.

BACKGROUND

In a common variant of the multi-task learning problem, datasets for multiple tasks are provided, each having a number of labeled training samples provided. The objective is to compute a model that can make predictions for each of the tasks (provided input data and an identifier of the task the input data belongs to). By training a single multi-task model instead of one model per task, synergies between related tasks can be exploited to provide more accurate predictions. Researchers have designed models for multiple modalities of inputs to their multi-task model, with modalities including those such as natural language processing (NLP) and computer vision data (see Hu, Ronghang, and Amanpreet Singh, "Unit: Multimodal multitask learning with a unified transformer," Proceedings of the IEEE/CVF International Conference on Computer Vision (2021) (hereinafter "Hu et al."), which is hereby incorporated by reference herein). In other existing technology, when dealing with auxiliary tasks, both the original and the auxiliary tasks can be used to train a joint model (see Liebel, Lukas, and Marco Korner, "Auxiliary tasks in multi-task learning," arXiv preprint arXiv:1805.06334 (2018) (hereinafter "Liebel et al."), which is hereby incorporated by reference herein). It is also possible according to existing technology to provide that edges of a graph connect tasks with others, and that a model for each task is trained, using a regularization term to incentivize connected tasks to have more similar model parameters (see He, Xiao, Francesco Alesiani, and Ammar Shaker, "Efficient and scalable multi-task regression on massive number of tasks," Proceedings of the AAAI Conference on Artificial Intelligence, Vol. 33, No. 01 (2019) (hereinafter "He et al."), which is hereby incorporated by reference herein).

SUMMARY

In an embodiment, the present invention provides a computer-implemented method for training one or more machine learning-artificial intelligence (ML-AI) models for multiple prediction tasks. Data is input for each task of a plurality of tasks and data for each additional data source of a plurality of additional data sources through a common trainable task representation function to obtain a resulting data representation for each task and each additional data source. Each resulting data representation is input through at least two individual trainable linear functions to obtain a corresponding prediction and a corresponding adversarial prediction. A prediction error for the plurality of tasks, an adversarial error across edges of a graph comprising the plurality of tasks and the plurality of additional data sources, an auxiliary error for the plurality of additional data sources, and a graph error between a given input graph and a graph induced by model weights are determined. Parameters of the common trainable task representation function and parameters of the two individual trainable linear functions are trained based on a comparison against a weighted sum of the prediction error, the adversarial error, the auxiliary error, and the graph error. The present invention can be used in a variety of applications including, but not limited to, several anticipated use cases in drug development, material synthesis, and medical/healthcare.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
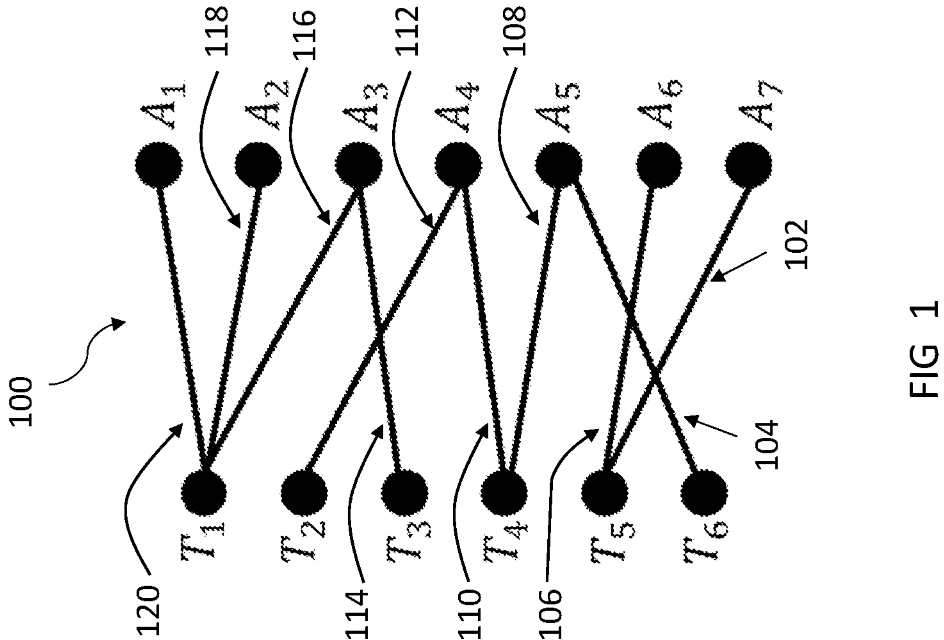
FIG. 1 illustrates a visualization of the problem setup, with target nodes T and additional nodes A.

Embodiments of the present invention provide improvements to predicting values of target variables connected to other variables by a bipartite or semantic graph. Embodiments of the present invention can provide for improvements to interconnected variables by accounting for heterogeneous or unavailable data, thereby reducing the requirements of datasets, allowing for improvements in accuracy of prediction models outputs, a reduction of the necessary computing resources needed to collect, compile, and store the datasets, and increased flexibility and adaptability of prediction models to different datasets.

Embodiments of the present invention provide solutions to overcome the technical problem of how to predict future values of multiple variables in the setting where the target variables can be connected to a set of additional input variables via bipartite or semantic graph. For example, embodiments of the present invention can provide the aforementioned solutions in a setting where the target variables are available as a bipartite or semantic graph, and in a setting where a more general graph is available, and the more general graph allows for a projection to a bipartite graph to be performed. Embodiments of the present invention provide a method for the scenario where the additional inputs are only available at training time, and a modified method that makes use of the additional data when it is also available at test time. Embodiments of the present invention can be practically applied to use cases in the technical fields including, but not limited to, digital medicine, life sciences, and smart cities.

Existing technology incorporating multi-task learning algorithms does not address the general case of partial relatedness between the tasks and the additional data sources. Rather, according to existing technology, there are limitations such as all data being considered relevant for all tasks (see Liebel et al. and Hu et al.), and there being no additional data sources considered at all (see Hu et al.). Embodiments of the present invention provide to overcome these limitations of existing technology and enhance computer functionality to address the task to predict future values of multiple target variables, where training data is available in the form of (a) historical time series of the previous target variable values, and (b) historical time series of additional non-target variables. Information on the relatedness between target variables and additional variables is available in form of a bipartite or semantic graph, where some non-target variables might be connected to multiple target variables and vice versa. Embodiments of the present invention can address two variants of this prediction problem.

Variant I: Additional history-only data. Historical data for the additional variables is available and can be used for training, but live data at test time is only available for the target variables. In this variant, exploitation of the additional data is limited to the model training phase.

Variant II: Additional historical and live data. Historical and live data is available both for the target and additional variables, thus the additional data can be used as input to the models to make predictions. Here, an embodiment of the present invention additionally addresses a dynamic scenario, where a subset of the live data can become unavailable during time periods, and where new data sources or even new tasks appear over time.

The bipartite or semantic graph can be already existing and provided, or can be constructed based on relationships among the entities, such as geographic proximity of objects. For example, the graph can be constructed to represent a network structure (e.g. road network, energy network), or it can be constructed to represent semantic relations (e.g. ownership). The provided or constructed graph can include a set of target tasks, a set of auxiliary tasks, and edges between the provided target tasks and auxiliary tasks. Each sample of the target tasks and the auxiliary tasks can include the identifier of a task, and the features of the nodes connected to the respective task's node.

The target tasks can each represent a measurement from a datum or data for an intended prediction of the graph, and the auxiliary tasks can represent data related to the respective target task. For example, if an overall prediction of the graph is the traffic situation in a given block, the target tasks can each represent a measurement from a single traffic counting sensor within the block, and the auxiliary tasks can represent other types of sensors within the block (e.g., air quality sensors in that block), traffic sensor measurements from neighboring blocks, or city-wide measurements (e.g., weather forecast). The auxiliary tasks can be provided and/or determined for each target task based on a number of processes. For example, one way to construct the graph is by using geographical closeness, e.g., sensors close to each other, connected via edges. However, no specific assumptions about how the graph is constructed are required, and the graph construction itself can also be performed according to many different processes known to those in the art.

The general representation of the target tasks and the auxiliary tasks, for example in the bipartite graph, thus allows for a representation of any measurements relevant for a given task. A multi-task model can be trained by combining the data from all tasks and from all auxiliary tasks, allowing for a model which is able to make predictions for multiple different blocks, in addition to each block of the target tasks.

In a first aspect, the present disclosure provides a computer-implemented method for training one or more machine learning-artificial intelligence (ML-AI) models for multiple prediction tasks. Data is input for each task of a plurality of tasks and data for each additional data source of a plurality of additional data sources through a common trainable task representation function to obtain a resulting data representation for each task and each additional data source. Each resulting data representation is input through at least two individual trainable linear functions to obtain a corresponding prediction and a corresponding adversarial prediction. A prediction error for the plurality of tasks, an adversarial error across edges of a graph comprising the plurality of tasks and the plurality of additional data sources, an auxiliary error for the plurality of additional data sources, and a graph error between a given input graph and a graph induced by model weights are determined. Parameters of the common trainable task representation function and parameters of the two individual trainable linear functions are trained based on a comparison against a weighted sum of the prediction error, the adversarial error, the auxiliary error, and the graph error.

In a second aspect, the present disclosure provides the method of the first aspect, wherein inputting each resulting data representation through the at least two individual trainable linear functions to obtain the corresponding prediction and the corresponding adversarial prediction further comprises: inputting the resulting representation of the data for each task to a first linear function of the at least two individual trainable linear functions to obtain the corresponding prediction; and inputting the resulting representation of the data for each additional data source to a second linear function of the at least two individual trainable linear functions to obtain the corresponding adversarial prediction.

In a third aspect, the present disclosure provides the method of the first or second aspects, wherein determining the prediction error for the plurality of tasks further comprises: subtracting an output of each task from each corresponding prediction to achieve a prediction error result for each task and corresponding prediction; and performing a summation of every prediction error result.

In a fourth aspect, the present disclosure provides the method of any of the first to third aspects, the method further comprising mapping each task and each additional data source to an embedding space, wherein determining the adversarial error across the edges of the graph further comprises determining the difference between: a first distance in the embedding space between the corresponding prediction for each task and the corresponding adversarial prediction for each task; and a second distance in the embedding space between the corresponding prediction for each additional data source and the corresponding adversarial prediction for each additional data source.

In a fifth aspect, the present disclosure provides the method of any of the first to fourth aspects, wherein the data for each task of the plurality of tasks and data for each additional data source of the plurality of additional data sources comprises historical time series data, and wherein determining the auxiliary error for the plurality of additional data sources further comprises: subtracting an output of each additional data source from each corresponding prediction to achieve an auxiliary error result for each additional data source and corresponding prediction; and performing a summation of the auxiliary error results.

In a sixth aspect, the present disclosure provides the method of any of the first to fifth aspects, wherein determining the graph error between the given input graph and the graph induced by the model weights further comprises: determining a difference between the graph a weighted induced graph from learned weights of the at least two individual trainable linear functions.

In a seventh aspect, the present disclosure provides the method of any of the first to sixth aspects, the method further comprising making a prediction using the one or more ML-AI models based on the training parameters of the common trainable task representation function.

In an eighth aspect, the present disclosure provides the method of any of the first to seventh aspects, wherein the plurality of additional data sources comprise a plurality of different types of data, the different types of data comprising data of one or more sensors or devices measuring different signals of an individual, wherein the graph comprises edges between a target medical condition and the data of the one or more sensors or devices, and wherein the one or more ML-AI models contribute to a target medical condition prediction of the individual.

In a ninth aspect, the present disclosure provides the method of any of the first to eighth aspects, wherein data for each task of the plurality of tasks comprises vehicle traffic indicators, and the plurality of additional data sources comprise a plurality of different types of data, the different types of data comprising data of street noise, and air quality, wherein the graph comprises edges between the vehicle traffic indicators and the street noise and air quality data, and wherein the one or more ML-AI models contribute to a traffic condition prediction.

In a tenth aspect, the present disclosure provides the method of any of the first to ninth aspects, wherein the data for each task of the plurality of task comprises manufacturing conditions of a material, and wherein the plurality of additional data sources comprise a plurality of different types of data, the different types of data comprising applied heating conditions and applied pressure conditions, wherein the graph comprises edges between the manufacturing conditions of the material and the applied heating conditions and the applied pressure conditions, and wherein the one or more ML-AI models contribute to a physical or chemical property prediction of the material.

In an eleventh aspect, the present disclosure provides a computer system comprising one or more hardware processors for training one or more machine learning-artificial intelligence (ML-AI) models for multiple prediction tasks which, alone or in combination, are configured to provide for execution of the method according to any of the first to tenth aspects.

In a twelfth aspect, the present disclosure provides a tangible, non-transitory computer-readable medium having instructions thereon which, upon being executed by one or more hardware processors, alone or in combination, provide for training one or more machine learning-artificial intelligence (ML-AI) models for multiple prediction tasks according to any of the first to tenth aspects.

In a thirteenth aspect, the present disclosure provides a computer-implemented method for training one or more machine learning-artificial intelligence (ML-AI) models for multiple prediction tasks. The method comprises: inputting data for each of a plurality of additional data sources to a parametrized normalization function to output a normalized additional data source; inputting data for each of a plurality of tasks and data for each normalized additional data source to a selection layer; selecting, by the selection layer, data for a selected task of the plurality of tasks and data for a selected normalized additional data source of the normalized additional data sources; inputting data for the selected task and data for the selected normalized additional data source to a prediction layer; and outputting a prediction for the selected task.

In a fourteenth aspect, the present disclosure provides the method according to the thirteenth aspect, wherein the plurality of additional data sources comprise a plurality of different types of data, and wherein outputting the normalized additional data source further comprises: time-shifting and linearly transforming each additional data source to obtain the normalized additional source for each additional data source; and parameterizing the normalized additional data source by a scaling parameter, a time-shift parameter, and a bias parameter.

In a fifteenth aspect, the present disclosure provides the method according to the fourteenth aspect, further comprising: inputting, to the selection layer, a normalized default input vector for a different task not included in the plurality of tasks.

Referring to FIG. 1, embodiments of the present invention can model the setup with a set $T=\{T_1, \ldots, T_n\}$ of target nodes and a set $A=\{A_1, \ldots, A_m\}$ of additional nodes. Each node can hold data in the form of a time series, and the objective is to construct a prediction model for each target node (e.g., $T_1$, $T_2$) in the set T, providing a joint model for the entire set of target tasks T. Further, graph 100 (e.g., a bipartite graph $G=(T \cup A, E)$) can be provided, where the edges $E \subseteq T \times A$ (e.g., edges 102-120) connect target nodes (e.g., $T_1$-$T_6$) with additional nodes (e.g., $A_1$-$A_7$). The edges E of the graph represent semantic relationships between the connected nodes, thus, for any edge $(T_i, A_i) \in E$ the data about additional node $A_i$ can be (potentially) useful for the construction of a prediction model for target node $T_i$. For example, target node $T_1$ can be connected to any and/or all of additional nodes $A_1$ via edge 120, $A_2$ via edge 118, and/or $A_3$ via edge 116. Moreover, multiple target nodes can be connected to the same additional node. For example, target node $T_4$ can be connected to additional node $A_5$ via edge 108, and target node $T_6$ can also be connected to additional node $A_5$ via a different edge, edge 104.

Variant I: Additional History-Only Data

In a first variant with history-only data, the additional data from additional nodes (e.g., $A_1$-$A_7$) in the set A might only be available at training time and might not be used as an input for execution of prediction models for target nodes (e.g., $T_1$-$T_6$) in the set T outside of the training phase. This scenario addresses the common case where an abundance of historical data is available (e.g., through open data portals), but access to live data is limited to fewer sources due to technical or legal restrictions, or because the data was collected during time-limited projects. To address this case, embodiments of the present invention can consider the data associated with each task as a time series of the form $T_i=\{(X_1, y_1) \ldots (X_{n_i}, y_{n_i})\}$, where $n_i$ is the number of predictable samples in the task $T_i$. $(X_j, y_j)$ is the pair of input features and the output of the task $T_i$. Similar to the procedure with the target nodes in the set T, the additional nodes in the set $A=\{A_1, \ldots, A_m\}$ are associated with a set of auxiliary tasks $A_i$, and each such auxiliary task takes the form $A_i=\{(Z_1, y_1) \ldots (Z_{n_i}, y_{n_i})\}$. The features $X_i$ and $Z_i$ can be the result of a feature engineering process. One such way to perform this is to use auto-regressive features such as $X_i=(y_{i-q}, \ldots, y_{i-1}) \in R^q$, where q>0 is the window size.

Advantageously, the prediction tasks do not necessarily need to be for similar quantities. For example, including tasks to predict energy consumption together with tasks to predict thermal comport in the same graph is not an issue, as an assumed similarity can be limited to the edges of the graph (e.g., edges 102-120 of the graph 100).

Figure 2:
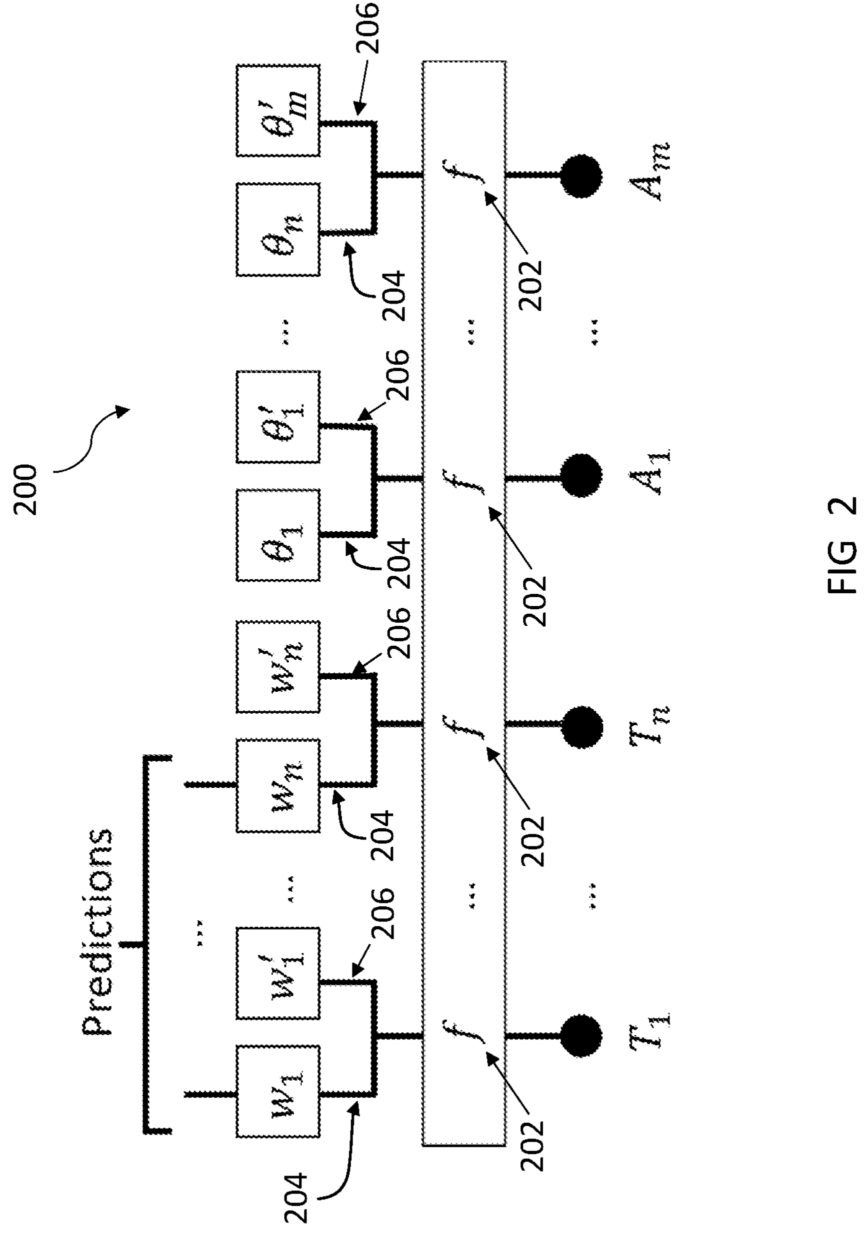
FIG. 2 schematically illustrates a method and system for value prediction according to an embodiment of the present invention.

FIG. 2 illustrates a model architecture 200. The data of each task $T_i$ and the data of each additional data source (auxiliary task $A_i$) can be applied to a common trainable task representation function. The common trainable task representation function can provide a common embedding function for embedding the data. This common trainable task representation function can, for example, be a two-layered multilayer perceptron (MLP) network.

The model architecture 200 includes the feature extractor $f$ (e.g., extractor 202) applied to the inputs of all tasks (e.g., tasks $T_i$ and auxiliary tasks $A_i$). For example, the feature extractor 202 can be applied to each input of each task (e.g., $T_1, \ldots, T_n$ and/or $A_1, \ldots, A_m$). The feature extractor 202 can obtain, from the input of each task, at least one feature (e.g., representation). A linear function (e.g., linear functions 204 and/or 206 shown as box operators) can be applied to the obtained at least one feature, where the linear function 204 and/or 206 can apply a different weight for each extracted feature and/or a different weight for each respective task (e.g., tasks $T_i$ and auxiliary tasks $A_i$). For instance, linear function 204 can apply weight $w_1$ for a feature extracted from target task $T_1$, an $n^{th}$ weight $w_n$ for a feature extracted from the $n^{th}$ target task $T_n$, weight $\theta_1$ for a feature extracted from auxiliary task $A_1$, and an $m^{th}$ weight $\theta_m$ for the same feature extracted from the $m^{th}$ auxiliary task $A_m$. The linear function 206 can apply weight $w'_1$ for the same feature extracted from target task $T_1$, an $n^{th}$ weight $w'_n$ for the same feature extracted from the $n^{th}$ target task $T_n$, weight $\theta'_1$ for the same feature extracted from auxiliary task $A_1$, and an $m^{th}$ weight $\theta'_m$ for the same feature extracted from the $m^{th}$ auxiliary task $A_m$. The linear functions 204 and/or 206 can then output the respective results as an input to an objective function. Additionally or alternatively, multiple feature extractors can be applied to each target and/or auxiliary task to extract multiple features from each task. For example, different feature extractions can be performed on the time series data. For instance, features can be extracted for each time period, e.g., using the last known value, the value before the last known value, the value from 1 hour ago. Additionally, the feature extractor can aggregate several past values (e.g. mean) resulting in a feature. These feature extraction methods are applicable across all embodiments.

Two individual linear functions (e.g., 204 and/or 206) can be applied per task as input to a min-max objective function. The linear functions can be represented by their respective vector of weights, and are applied to produce the output prediction. The linear functions can be applied, for example, by taking the dot product of the respective weights vector with the corresponding input vector. For example, $$W = [w_1^T, \ldots, w_n^T] \in R^{n \times p}$$

(e.g., linear function 204) can be a matrix of learned weights for the target tasks $T_i$, where $$w_i^T$$

is the row vector of W that linearly maps the (p-dimensional) feature embedding of task $T_i$ to the output space R. For a feature embedding width p, a task-independent feature extractor $f: R^{b \times q} \rightarrow R^{b \times P}$ computes the feature embeddings for a batch of b samples. Further, $$W' = [w'^T_1, \ldots, w'^T_n]$$

$\in R^{n \times p}$ (e.g., linear function 206) can be an adversarial weight matrix for the target tasks. Similarly, the weights and adversarial weights (e.g., weights $$\Theta = [\theta_1^T, \ldots, \theta_m^T]$$

of linear function 204 and weights $\Theta'$=

$$[\theta'^T_1, \ldots, \theta'^T_m]$$

$\in R^{m \times p}$ of linear function 206) can be designed for the auxiliary tasks $A_i$.

The objective function can be optimized, resulting in the final model which can be applied in the prediction phase for all tasks. The objective function can identify the desired feature extractor $f(.)$ and obtain the weight matrices W, W', $\Theta$, $\Theta'$:

$$\arg\min_{W,\Theta,f(\cdot)} \max_{W',\Theta'} \epsilon_{train} + \lambda_1 \epsilon_{advers} + \lambda_2 \epsilon_{aux} + \lambda_3 \epsilon_{graph}$$

$$\epsilon_{train} = \sum_{T_i \in T} \| w_i^T f(X_i) - y_i \|_2^2$$

$$\epsilon_{advers} = \sum\nolimits_{(T_i, A_j) \in E} \left| d(w_i^T f(X_i), w'^T_i f(X_i)) - d(\theta_j^T f(Z_j), \theta'^T_j f(Z_j)) \right| + \|W - W'\|_2 + \|\Theta - \Theta'\|_2$$

$$\epsilon_{aux} = \sum_{A_j \in A} \| f(Z_j) \theta_j^T - y_j \|_2^2$$

where: d(a, b) is a distance function between the a and b in the output. For instance, $$d(w_i^T f(X_i), w'^T_i f(X_i)) - d(\theta_j^T f(Z_j), \theta'^T_j f(Z_j))$$

is equal to the distance between the $$(w_i^T f(X_i), w'^T_i f(X_i))$$

and the $$\left(\theta_j^T f(Z_j), \theta'^T_j f(Z_j)\right)$$

in the output.

The feature extractor can take the form of a function $f(.)$: $R^{b\times q}\rightarrow R^{b\times p}$ (for a batch of b samples) that could be implemented as a linear embedding or neural network, or any other form of parametrized functions, where $X_i\in R^{b\times q}$ contains the batch of b samples and $Y_i\in R^b$ contains the corresponding labels. $\lambda_1$, $\lambda_2$, $\lambda_3>0$ are hyperparameters that help weighting the additional losses $\epsilon_{advers}$, $\epsilon_{aux}$, and $\epsilon_{graph}$, respectively. $\epsilon_{train}$ is the training loss on the target tasks. $\epsilon_{advers}$ is the loss that causes the learning of a feature extractor that maps each target task $T_i$ and its associated auxiliary task(s) $A_i$ invariantly to the embedding space. The second and third terms in this loss can target to avoid a trivial solution when W' takes the same value as W or Θ taking the same value as Θ'. $\epsilon_{graph}$ is a graph distance measure between the original graph G and the weighted induced graph from the learned weights W and Θ. One such a distance is the graph edit distance that measures the dissimilarity between graphs based on the count of node and edge insertion and deletion operations.

In a simpler variant, for example, the objective function without Θ' can be used as follows:

$$\arg\min_{W,\Theta,f(\cdot),\alpha}\max_{W'}\epsilon_{train}+\lambda_1\epsilon_{advers}+\lambda_2\epsilon_{aux}+\lambda_3\epsilon_{graph}$$

where $\epsilon_{advers}$ is rewritten to take the form:

$$\epsilon_{advers}=\sum_{T_i\in T}\sum_{A_j\in Nei(T_i)}\alpha_j\left|d\left(w_i^T f(X_i), w_i'^T f(X_i)\right)-d\left(\theta_j^T f(Z_j), \theta_j^{T\prime} f(Z_j)\right)\right| \text{ s.t. } \|\alpha\|_2=1$$

One difference between this embodiment and the previous one can be that the adversarial loss employs only the target predictors on both target and auxiliary tasks. Here the adversary learns one set of weights per target task with the purpose of distinguishing, for each connected auxiliary task, between auxiliary and target task embedding, where the distinction is performed by alignment with the predicted value on the target task and misalignment on the auxiliary task, or vice versa.

The parameters and hyperparameters in the objective function are each trainable. As a result, this leads to learning the task representation function and the linear models for the tasks and the auxiliary tasks. Moreover, the objective function defines a nonlinear function in terms of the parameters and the hyperparameters. Therefore, by using the computed errors and gradients, the objective function can obtain minima.

Embodiments achieving the aforementioned objectives can advantageously be simply implemented and optimized using gradient methods such as in the ADAM optimizer of the present disclosure. To this end, alternate optimization can be employed by solving once for the minimization and once for the maximization that searches for the components of adversarial hypothesis. Standard stopping criteria for gradient descent can be applied. For example, either the training stops after a predefined number of epochs, or after the performance on an independent validation set stops improving or reaches a certain level.

For the prediction phase, it can be advantageously provided according to an embodiment that a vastly simplified formula can be used, where only $$w_i^T f(X_i)$$

is evaluated to obtain a prediction for task $T_i$.

Variant II: Additional Historical and Live Data

When access to the additional data sources from the set A (e.g., $A_1$-$A_7$) are given at a prediction time, the prediction model can receive the additional data sources as inputs for the connected target nodes from the set T (e.g., $T_1$-$T_6$). In this setting, each additional data source $A_j\in A$ can be some known type, $tp(A_j)\in TP=\{\tau_1, \ldots, \tau_k\}$, where TP is a set of given data source types.

Variant II has the Following Features:

- For each task $T_i\in T$, the architecture of the prediction model (e.g., model architecture) has access to the set $\{A_j|(T_i, A_j)\in G\}$ of input data sources.
- The set $\{tp(A_j)|(T_i, A_j)\in G\}$ is the set of input types available for task $T_i$. For example, one input of every type can be available to the architecture of the prediction model; otherwise, a selection or aggregation mechanism can be used.
- Every type τ of input might not be, in general, available to every task.
- Inputs $A_j$ can potentially be shared among several tasks $\{T_i|(T_i, A_j)\in G\}$.

An embodiment of the present invention can further address the dynamic scenario where, over time, inputs and tasks can be added to and removed from the sets A and T, respectively.

Figure 3:
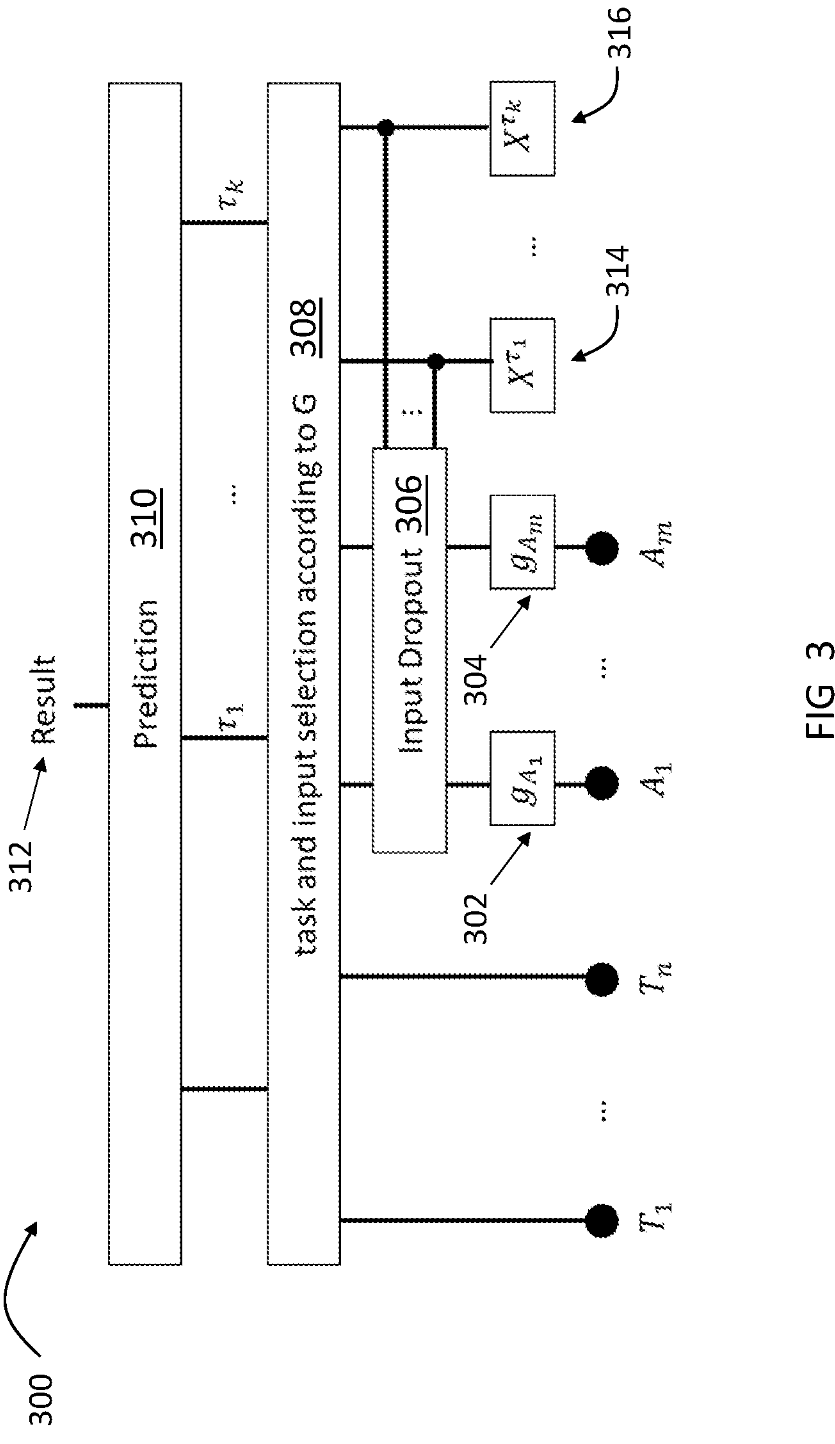
FIG. 3 schematically illustrates a method and system for value prediction according to an embodiment of the present invention where live data is available for all inputs.

FIG. 3 illustrates a model architecture 300 for the case where live data is available for all inputs (e.g., variant II). The additional inputs (e.g., each additional input from the first additional input $A_1$ to the $m^{th}$ additional input $A_m$) can be passed through individual normalization functions, followed by a dropout where they can be replaced by the default input of the same type. For instance, the first additional input $A_1$ can be an input to a normalization function (e.g., function 302) to produce the resultant $g_{A1}$, and the normalization function 302 can output the resultant that is received as an input to a dropout layer 306. The $m^{th}$ additional input $A_m$ can be an input to normalization function (e.g., function 304) to produce resultant $g_{Am}$, and the normalization function 304 can also output the resultant that is received as an input to the dropout layer 306. The dropout layer 306 can then take the received inputs from functions 302 and/or 304 and obtain a default input (e.g., inputs 314 and/or 316 corresponding to the respective type of input of additional inputs. For example, the dropout layer 306 can obtain a default input $X^{\tau}1$ corresponding to additional input $A_1$ and a default input $X^{\tau}k$ corresponding to the $m^{th}$ additional input $A_m$.

A selection layer 308 can receive the tasks and inputs and select the tasks and inputs according to G (a bipartite graph). The selection layer 308 can use the task identifier of a task to identify the features of the nodes connected to the task's node, and can forward those identified features to the next layer. The selection layer 308, therefore, can perform a switching operation, ensuring that the relevant data is forwarded to the next layer. After selecting the inputs for each task according to G (e.g., a bipartite graph G=(T∪A, E)), the trained prediction layer 310 computes the predicted value for the task and outputs the result 312. The prediction layer 310 can receive, as inputs, data corresponding to different types τ. For any time step t, the inputs can consist of the previous k values of the target task and additional data time series, that is $$x_{t-k}^{T}, \ldots, x_{t-1}^{T}$$

for each T∈T and $$x_{t-k}^{A}, \ldots, x_{t-1}^{A}$$

for each A∈A.

Input normalization: in a first step, the architecture 300 of the prediction model can apply a parameterized normalization to each of the data sources in the set A (e.g., additional inputs $A_1$ through $A_m$). This can harmonize the representation across inputs of the same type, for example to compensate effects of the same sensors being installed at different places in a building, pointing into different directions, or having different levels of sensitivity or time delays. The input normalization, therefore, can be applied when the data from the connected nodes is used as input during a test time.

While specialized functions for specific input types could be utilized, an embodiment of the present invention can advantageously use a generic function suitable for a broad range of devices that produce time series of values. For any data source A∈A, the series of values $$x_{t-k}^{A}, \ldots, x_{t-1}^{A}$$

can be mapped to a time-shifted and linearly transformed series of the form:

$$g_{\Phi^A}\left(x_{t-k}^{A}, \ldots, x_{t-1}^{A}\right) = \phi_1^A \cdot \left(\left(\Phi_2^A - \lfloor \Phi_2^A \rfloor\right) x_{t-(i-\lceil \Phi_2^A \rceil) mod k}^{A} + \left(\lceil \Phi_2^A \rceil - \Phi_2^A\right) x_{t-(i-\lfloor \Phi_2^A \rfloor mod k}^{A}\right)_{i=0}^{k-1} \quad \text{Equation (1)}$$

For each additional input A (e.g., additional inputs $A_1$ through $A_m$), the function can be parameterized by three parameters $$\Phi_1^A, \Phi_2^A, \Phi_3^A$$

to control the scaling factor, the time-shift, and the bias term, respectively. The time shift admits fractional values, which are interpreted by linear interpolation, which can make the whole expression differentiable almost everywhere; thus, the parameters can be trained by gradient-based methods such as stochastic gradient descent.

Default input: Additionally, for each input type τ, the architecture 300 of a method according to an embodiment of the present invention can maintain a default input vector $$X^{\tau} = x_0^{\tau} \ldots x_{k-1}^{\tau} \in R^k$$

which can be trained to compensate for the situation where no input of type τ is available. The default input vector per type can be a constant, or it can be a trainable function that takes the current time as input and produces the default input vector for the current time as output.

Input dropout: In a second step, the architecture 300 of the prediction model can address the heterogeneity of data source availability, advantageously making the models robust against unavailability of data sources. This can be achieved by an input dropout layer (e.g., dropout layer 306). For any input A∈A, $g_A$ symbolizes the result of the application of $g_{\Phi^A}$ to it. For some p∈{0,1} the dropout is realized by a probabilistic function defined by:

$$h_A := \begin{cases} g_A & \text{with probability } 1-p \\ X^{\tau(A)} & \text{with probability } p \end{cases}$$

Prediction: In a third step, an additional layer (e.g., prediction layer 310) of the architecture 300 represents some multivariate time series prediction model, e.g. long short-term memory (LSTM), gated recurrent unit (GRU), or transformer-type network, parameterized by Θ. The layer 310 can include $$M_{\Theta} : R^{|TP+1| \times k} \to R$$

a multi-variate time series prediction model, parameterized by Θ, taking as input one time series per input type τ∈TP (in addition to the time series related to the target task T), with a time window length of k. For each task T, the first |TP| k-ary inputs for M are constructed by:

$$\begin{pmatrix} h_A & \text{if } \exists A: (A, T) \in G \\ X^{\tau} & \text{otherwise} \end{pmatrix}_{\tau \in TP}$$

Model training: The model parameters $\{\Phi^A | A \in A\}$, $\{X^{\tau} | \tau \in TP\}$, Θ can be trained using a gradient-based method (e.g., stochastic gradient descent), to minimize some error function (e.g., the mean square error) across all tasks. During training, the dropout rate p is set to some value between 0 and 1.

Model specialization: Starting from the parameters $\{\Phi^A | A \in A\}$, $\{X^{\tau} | \tau \in TP\}$, Θ of the model training phase, a refined parameter vector $\Theta^T$ can be trained for each task via a gradient-based method (e.g., stochastic gradient descent), to minimize the same error function as in the model training phase, but using only data from task T and the inputs A: (A, T)∈G. During training, the dropout rate p is set to some value between 0 and 1.

Prediction: For predicting a value $$X_t^T$$

of some task T∈T, the trained model can be applied with parameters $\{\Phi^A | A \in A, (A, T) \in G\}$, $\{X^{\tau} | \tau \in TP\}$, $\Theta^T$ and p=0.

This includes the case where the set of inputs $(A, T) \in G$ at prediction time is only a subset of the set of inputs available at training time.

Added data sources: When a new data source A' is added to the set A, the normalization parameters $\Phi^{A}$ might still be unknown, and some amount of data from A' needs to be collected. As soon as a few dozens of samples have been collected, the parameter vector $\Phi^{A}$ can be trained with the data of all tasks in the set T with $(A', T) \in G$, keeping the other parameters $\{\Phi^{A} | A \neq A'\}$, $\{X^{\tau} | \tau \in TP\}$, $\Theta^{T}$ fixed, and setting p=0.

Added tasks: When a new task is added and no data has been collected from it yet, the task-specific model parameters can be initialized as $\Theta^{T} := 0$. With some amount of data collected, the model specialization procedure as described above can be applied.

Embodiments of the present invention can be practically applied to effect further improvements in a number of technical fields, in addition to the improvements in computational performance and accuracy in predicting future variables generally. For example, applications include use cases in technical fields such as digital medicine or automated healthcare (e.g., for AI assisted drug development, vaccine design, personalized medicine, etc.), smart buildings or cities (e.g., for automated traffic management, sensor, thermal, energy or building controls, or for controlling sensors or resources in a smart industrial plant), system monitoring, including biomedical uses (e.g., for monitoring blood sugar, heartbeat or blood pressure) or material informatics (e.g., for composition or material design).

For example, for a use case in smart cities for automated traffic management, an embodiment of the present invention can be applied to a scenario in which heterogeneous sensors are deployed across a city to count the traffic, measure noise, and measure air quality, where the target is to monitor and predict the traffic situation in every city block at every time, despite the fact that not all blocks are equipped with all sensors. Application of the method according to an embodiment of the present invention provides that the bipartite graph connects traffic counting sensors with nearby other sensors measuring air quality and noise, and a robust traffic prediction model is obtained for the future amount of traffic in every city block. Improvements or technical effects include, for example, more accurate prediction of traffic situations, and automated decision making based thereon, such as automatic scheduling of traffic lights and road signage in reaction to the predictions.

An example of a use case in digital medicine or system monitoring to which an embodiment of the present invention can be applied relates to a scenario in which patients are connected to one or more sensors or devices measuring signals of their bodies, but not every patient is connected to all devices, and certain data sources are shared among patients (e.g., the weather data in the areas where the patients are located, or information about the medical unit), and the target is to predict critical situations (e.g., regarding blood pressure or regarding glucose levels). Application of the method according to an embodiment of the present invention provides that the bipartite graph connects the target variable (e.g., blood pressure) to other signals relevant for the same patient, and a robust prediction model is obtained for all patients. Improvements or technical effects include more accurate prediction of health parameters, and potential automated diagnoses or treatments (e.g., application of an insulin dose). System monitoring can be applied to other monitoring situations, such as in a smart industrial plant or IoT system in a correlated manner.

An example of a use case in material informatics to which an embodiment of the present invention can be applied relates to a scenario in which material properties are connected to several manufacturing and processing factors that are described using measured signals, but not all materials are connected to all auxiliary procedures, and certain auxiliary manufacturing procedures are shared among materials (e.g., the applied heating and pressure during production), and the target is to predict the physical and chemical properties of newly designed materials. Application of the method according to an embodiment of the invention, for example the architecture 300, provides that the bipartite graph connects the target variable (e.g., the manufacturing conditions under which the material is being processed) to other signals relevant for the same material, and a robust prediction model is obtained for all materials where the auxiliary procedures can be used as input to the model during a test time. Improvements or technical effects include more accurate prediction of material properties, such as stability and robustness, and automatic recommendation of alternative design(s) when maximizing a particular property.

In an embodiment, the present invention provides a method for training for multiple prediction tasks comprising the steps of:

1) Applying the data of each task and the data of each additional data source to a common trainable task representation function.
2) Applying the resulting data representation of each task and additional data source to two individual trainable linear functions per task/data source to obtain predictions and adversarial predictions.
3) Computing the prediction error for the tasks, the adversarial error across the edges of the bipartite graph, the auxiliary error for the additional data source, and the graph error between the given input graph and the graph induced by the model weights.
4) Improving the parameters of all trainable functions against a weighted sum of the four error functions described in step 3).

Embodiments of the present invention provide for the following improvements over existing technology:

1. Applying an adversarial domain adaptation technique across all edges of the bipartite graph, as reflected in the objective function for the case with additional historical data available.
2. Using an input adaptation layer to auto-calibrate the data sources during training, as described above with respect to the input normalization procedure, employing a function with a trainable parameter for a linear factor, an additive constant and a time shift.
3. Both replacing missing values and performing dropout with a trained default input for each input type, as described above with respect to the default input and input dropout procedures, which makes the models robust against missing inputs during training and during execution.
4. Enabling to use additional data in the form of the auxiliary tasks, together with expert knowledge (formalized in the bipartite graph) for better generalizability and increased accuracy of the learned models and robustness against missing data sources.

Figure 4:
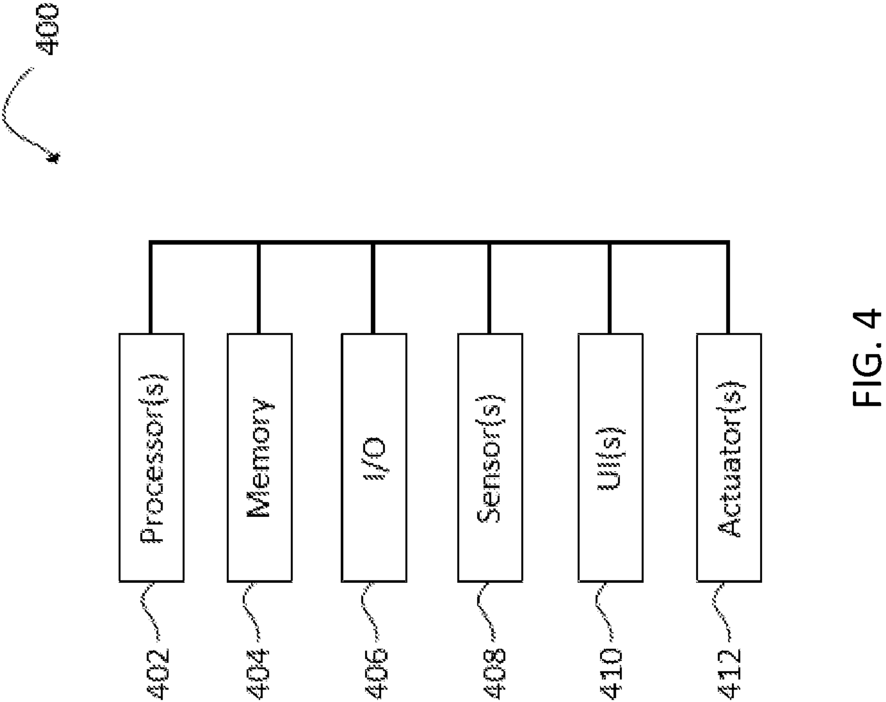
FIG. 4 is a block diagram of an exemplary processing system, which can be configured to perform any and all operations disclosed herein.

Referring to FIG. 4, a processing system 400 can include one or more processors 402, memory 404, one or more input/output devices 406, one or more sensors 408, one or more user interfaces 410, and one or more actuators 412. Processing system 400 can be representative of each computing system disclosed herein.

Processors 402 can include one or more distinct processors, each having one or more cores. Each of the distinct processors can have the same or different structure. Processors 402 can include one or more central processing units (CPUs), one or more graphics processing units (GPUs), circuitry (e.g., application specific integrated circuits (ASICs)), digital signal processors (DSPs), and the like. Processors 402 can be mounted to a common substrate or to multiple different substrates.

Processors 402 are configured to perform a certain function, method, or operation (e.g., are configured to provide for performance of a function, method, or operation) at least when one of the one or more of the distinct processors is capable of performing operations embodying the function, method, or operation. Processors 402 can perform operations embodying the function, method, or operation by, for example, executing code (e.g., interpreting scripts) stored on memory 404 and/or trafficking data through one or more ASICs. Processors 402, and thus processing system 400, can be configured to perform, automatically, any and all functions, methods, and operations disclosed herein. Therefore, processing system 400 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 400 can be configured to perform task "X". Processing system 400 is configured to perform a function, method, or operation at least when processors 402 are configured to do the same.

Memory 404 can include volatile memory, non-volatile memory, and any other medium capable of storing data. Each of the volatile memory, non-volatile memory, and any other type of memory can include multiple different memory devices, located at multiple distinct locations and each having a different structure. Memory 404 can include remotely hosted (e.g., cloud) storage.

Examples of memory 404 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 404.

Input-output devices 406 can include any component for trafficking data such as ports, antennas (i.e., transceivers), printed conductive paths, and the like. Input-output devices 406 can enable wired communication via USB®, DisplayPort®, HDMI®, Ethernet, and the like. Input-output devices 406 can enable electronic, optical, magnetic, and holographic, communication with suitable memory 406. Input-output devices 406 can enable wireless communication via WiFi®, Bluetooth®, cellular (e.g., LTE®, CDMA®, GSM®, WiMax®, NFC®), GPS, and the like. Input-output devices 406 can include wired and/or wireless communication pathways.

Sensors 408 can capture physical measurements of environment and report the same to processors 402. User interface 410 can include displays, physical buttons, speakers, microphones, keyboards, and the like. Actuators 412 can enable processors 402 to control mechanical forces.

Processing system 400 can be distributed. For example, some components of processing system 400 can reside in a remote hosted network service (e.g., a cloud computing environment) while other components of processing system 400 can reside in a local computing system. Processing system 400 can have a modular design where certain modules include a plurality of the features/functions shown in FIG. 4. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for training one or more machine learning-artificial intelligence (ML-AI) models for multiple prediction tasks, the method comprising:

inputting data for each task of a plurality of tasks and data for each additional data source of a plurality of additional data sources through a common trainable task representation function to obtain a resulting data representation for each task and each additional data source;

inputting each resulting data representation through at least two individual trainable linear functions to obtain a corresponding prediction and a corresponding adversarial prediction;

determining a prediction error for the plurality of tasks, an adversarial error across edges of a graph comprising the plurality of tasks and the plurality of additional data sources, an auxiliary error for the plurality of additional data sources, and a graph error between a given input graph and a graph induced by model weights; and training parameters of the common trainable task representation function and parameters of the two individual trainable linear functions based on a comparison against a weighted sum of the prediction error, the adversarial error, the auxiliary error, and the graph error.

2. The method of claim 1, wherein inputting each resulting data representation through the at least two individual trainable linear functions to obtain the corresponding prediction and the corresponding adversarial prediction further comprises:

inputting the resulting representation of the data for each task to a first linear function of the at least two individual trainable linear functions to obtain the corresponding prediction; and inputting the resulting representation of the data for each additional data source to a second linear function of the at least two individual trainable linear functions to obtain the corresponding adversarial prediction.

3. The method of claim 1, wherein determining the prediction error for the plurality of tasks further comprises:

subtracting an output of each task from each corresponding prediction to achieve a prediction error result for each task and corresponding prediction; and performing a summation of every prediction error result.

4. The method of claim 1, the method further comprising mapping each task and each additional data source to an embedding space, wherein determining the adversarial error across the edges of the graph further comprises determining the difference between:

a first distance in the embedding space between the corresponding prediction for each task and the corresponding adversarial prediction for each task; and a second distance in the embedding space between the corresponding prediction for each additional data source and the corresponding adversarial prediction for each additional data source.

5. The method of claim 1, wherein the data for each task of the plurality of tasks and data for each additional data source of the plurality of additional data sources comprises historical time series data, and wherein determining the auxiliary error for the plurality of additional data sources further comprises:

subtracting an output of each additional data source from each corresponding prediction to achieve an auxiliary error result for each additional data source and corresponding prediction; and performing a summation of the auxiliary error results.

6. The method of claim 1, wherein determining the graph error between the given input graph and the graph induced by the model weights further comprises:

determining a difference between the graph a weighted induced graph from learned weights of the at least two individual trainable linear functions.

7. The method of claim 1, the method further comprising making a prediction using the one or more ML-AI models based on the training parameters of the common trainable task representation function.

8. The method of claim 1, wherein the plurality of additional data sources comprise a plurality of different types of data, the different types of data comprising data of one or more sensors or devices measuring different signals of an individual, wherein the graph comprises edges between a target medical condition and the data of the one or more sensors or devices, and wherein the one or more ML-AI models contribute to a target medical condition prediction of the individual.

9. The method of claim 1, wherein data for each task of the plurality of tasks comprises vehicle traffic indicators, and the plurality of additional data sources comprise a plurality of different types of data, the different types of data comprising data of street noise, and air quality, wherein the graph comprises edges between the vehicle traffic indicators and the street noise and air quality data, and wherein the one or more ML-AI models contribute to a traffic condition prediction.

10. The method of claim 1, wherein the data for each task of the plurality of task comprises manufacturing conditions of a material, and wherein the plurality of additional data sources comprise a plurality of different types of data, the different types of data comprising applied heating conditions and applied pressure conditions, wherein the graph comprises edges between the manufacturing conditions of the material and the applied heating conditions and the applied pressure conditions, and wherein the one or more ML-AI models contribute to a physical or chemical property prediction of the material.

11. A tangible, non-transitory computer-readable medium having instructions thereon which, upon being executed by one or more hardware processors, alone or in combination, provide for training one or more machine learning-artificial intelligence (ML-AI) models for multiple prediction tasks according to claim 1.

12. A computer system comprising one or more hardware processors for training one or more machine learning-artificial intelligence (ML-AI) models for multiple prediction tasks which, alone or in combination, are configured to provide for execution of the following steps:

inputting data for each task of a plurality of tasks and data for each additional data source of a plurality of additional data sources through a common trainable task representation function to obtain a resulting data representation for each task and each additional data source;

inputting each resulting data representation through at least two individual trainable linear functions to obtain a corresponding prediction and a corresponding adversarial prediction;

determining a prediction error for the plurality of tasks, an adversarial error across edges of a graph comprising the plurality of tasks and the plurality of additional data sources, an auxiliary error for the plurality of additional data sources, and a graph error between a given input graph and a graph induced by model weights; and training parameters of the common trainable task representation function and parameters of the two individual trainable linear functions based on a comparison against a weighted sum of the prediction error, the adversarial error, the auxiliary error, and the graph error.

* * * * *